US007003277B2

(12) United States Patent
Toshida

(10) Patent No.: US 7,003,277 B2
(45) Date of Patent: Feb. 21, 2006

(54) PORTABLE COMMUNICATION TERMINAL, COMMUNICATION METHOD OF THE PORTABLE COMMUNICATION TERMINAL, PROGRAM, AND RECORDING MEDIUM HAVING THE PROGRAM RECORDED THEREON

(75) Inventor: Masahiro Toshida, Kanagawa (JP)

(73) Assignee: Sony Corporation, Tokyo (JP)

( * ) Notice: Subject to any disclaimer, the term of this patent is extended or adjusted under 35 U.S.C. 154(b) by 528 days.

(21) Appl. No.: 10/242,173

(22) Filed: Sep. 12, 2002

(65) Prior Publication Data

US 2003/0064703 A1    Apr. 3, 2003

(51) Int. Cl.
*H04B 1/16* (2006.01)
(52) U.S. Cl. ............... 455/343.1; 455/574; 455/127.1; 455/572
(58) Field of Classification Search ............... 455/574, 455/343.1, 343.2, 343.5
See application file for complete search history.

(56) References Cited

U.S. PATENT DOCUMENTS

| | | | |
|---|---|---|---|
| 6,047,169 A * | 4/2000 | Dent ........................ 455/127.5 |
| 6,212,398 B1 * | 4/2001 | Roberts et al. ............. 455/574 |
| 6,243,597 B1 * | 6/2001 | Daanen ....................... 455/574 |
| 6,487,264 B1 * | 11/2002 | Alley et al. .............. 455/343.1 |
| 6,615,060 B1 * | 9/2003 | Usui ....................... 455/343.1 |
| 6,725,067 B1 * | 4/2004 | Marx et al. .............. 455/343.2 |
| 2002/0127987 A1 * | 9/2002 | Kent .......................... 455/255 |
| 2005/0043068 A1 * | 2/2005 | Shohara et al. ............. 455/574 |

* cited by examiner

*Primary Examiner*—Edward F. Urban
*Assistant Examiner*—Lana Le
(74) *Attorney, Agent, or Firm*—Jay H. Maioli

(57) ABSTRACT

A communication control processor controls communication of a portable communication terminal with external units, in which a data processing control processor performs communication with the communication control processor and controls a ROM, a RAM, an operating unit, and a display unit. The data processing control processor is supplied with a first clock signal, while the communication control processor is supplied with a second clock signal based on the first clock signal from the data processing control processor. Thus, each of the processors can transmit Universal Asynchronous Receiver Transmitter data even when the other processor is in a sleep state without knowing it, and the other processor can receive the data without an error in reception. Furthermore, the data processing control processor and the communication control processor can turn on/off a high-speed clock, as in a sleep control, independently of each other. Thus, sleep time can be maximized, and consequently power consumption can be reduced.

7 Claims, 8 Drawing Sheets

PORTABLE COMMUNICATION TERMINAL, COMMUNICATION METHOD OF THE PORTABLE COMMUNICATION TERMINAL, PROGRAM, AND RECORDING MEDIUM HAVING THE PROGRAM RECORDED THEREON

BACKGROUND OF THE INVENTION

The present invention relates to reduction of power consumption of a portable communication terminal such as a portable telephone or the like.

A conventional portable telephone includes a communication control processor and a data processing control processor for controlling a man-machine interface such as a keypad, a liquid crystal display and the like. FIG. 1 shows an internal configuration of a conventional portable telephone 100.

Receiving operation of the conventional portable telephone will be described with reference to FIG. 1. A digital baseband unit 104 converts a signal received by an RF (Radio Frequency) unit 102 into a baseband signal. A communication control processor 110 processes the baseband signal. Depending on contents of the baseband signal, the communication control processor 110 transmits data to a data processing control processor 120. The data processing control processor 120 receives the data from the communication control processor 110, and outputs data to be displayed on a display unit 108 (for example a liquid crystal display).

Transmitting operation of the conventional portable telephone will be described. First, the data processing control processor 120 receives a user input from an operating unit 106 (for example a keypad). Depending on contents of the user input, the data processing control processor 120 transmits data to the communication control processor 110. The communication control processor 110 receives the data from the data processing control processor 120, and transmits the data via the digital baseband unit 104 and the RF unit 102.

Thus, the communication control processor 110 and the data processing control processor 120 perform therebetween communication and data processing (to display data on the display unit 108 and transmit data via the digital baseband unit 104 and the like). In order to allow such communication and data processing, power and clocks of both the communication control processor 110 and the data processing control processor 120 are turned on. Hence, not only a setup signal line 131 for data transmission and reception and a signal line 132 for data transmission and reception but also signal lines 134a and 134b for communicating a state (whether the clock is on) of each of the communication control processor 110 and the data processing control processor 120 to the other and interrupt signal lines 136a and 136b for each of the communication control processor 110 and the data processing control processor 120 to turn on the clock of the other are provided between the communication control processor 110 and the data processing control processor 120.

For example, in a case of an incoming call, the communication control processor 110 may perform communication and data processing with the data processing control processor 120. Thus, the communication control processor 110 grasps the state of the data processing control processor 120 through the signal line 134b, and when the data processing control processor 120 is in a sleep state, the communication control processor 110 turns on the clock of the data processing control processor 120 through the signal line 136a.

Incidentally, the communication control processor 110 may not perform communication and data processing with the data processing control processor 120. However, when the clock of the data processing control processor 120 is not turned on and a need arises for communication and data processing with the data processing control processor 120, the need cannot be met. Therefore, each time there is an incoming call, the communication control processor 110 needs to perform the processing of grasping the state of the data processing control processor 120 and turning on the clock of the processor 120.

However, when one of the clocks of the communication control processor 110 and the data processing control processor 120 is turned on with an incoming call or the like, the other of the clocks of the communication control processor 110 and the data processing control processor 120 needs to be turned on, thus resulting in too much power consumption by the communication control processor 110 and the data processing control processor 120.

SUMMARY OF THE INVENTION

It is accordingly an object of the present invention to reduce power consumption of the communication control processor and the data processing control processor.

The present invention relates to a portable communication terminal. The portable communication terminal according to the present invention performs communication with the exterior thereof. The portable communication terminal according to the present invention has communication control means, data processing control means, and first clock signal supply means.

The communication control means controls the communication with the exterior. The data processing control means performs communication with the communication control means. The first clock signal supply means supplies a first clock signal to the data processing control means.

Further, the data processing control means includes second clock signal supply means. The second clock signal supply means supplies a second clock signal based on the first clock signal to the communication control means.

With the thus formed portable communication terminal according to the present invention, the data processing control means is supplied with the first clock signal, and the communication control means is supplied with the second clock signal. Thus, it is possible to perform communication between the data processing control means and the communication control means. In addition, it is not necessary for both means to be in an awake state to enable the communication, and therefore power consumption can be reduced.

In the present invention, frequency dividing means may divide frequency of the first clock signal to provide the second clock signal. Also in this case, the communication control means can perform communication. Since clock frequency of the second clock signal is lowered, power consumption can be further reduced.

In addition, in the present invention, clock selecting means supplies a high-speed clock signal as the first clock signal to the second clock signal supply means when the data processing control means is in an awake state, and supplies a low-speed clock signal as the first clock signal to the second clock signal supply means when the data processing control means is in a sleep state or in a state of transition to the awake state.

The awake state mentioned above refers to a state in which power and a clock for data processing are on, whereas the sleep state refers to a state in which the power is on but the clock for data processing is off.

Further, in the present invention, the data processing control means is shifted from a sleep state to an awake state using as a reference timing of receiving a signal from the communication control means. For example, the data processing control means is shifted from the sleep state to the awake state immediately after receiving the signal from the communication control means, or after receiving a signal of a predetermined magnitude.

Thus, each of the means can go into the sleep state independently without an instruction from the other means. In addition, each of the means can transmit data regardless of whether the other means is in the awake state or in the sleep state, and the other means can receive the data without errors.

The above and other objects, features and advantages of the present invention will become apparent from the following description and the appended claims, taken in conjunction with the accompanying drawings in which like parts or elements denoted by like reference symbols.

DETAILED DESCRIPTION OF PREFERRED EMBODIMENTS

Preferred embodiments of the present invention will hereinafter be described with reference to the drawings.

Figure 1:
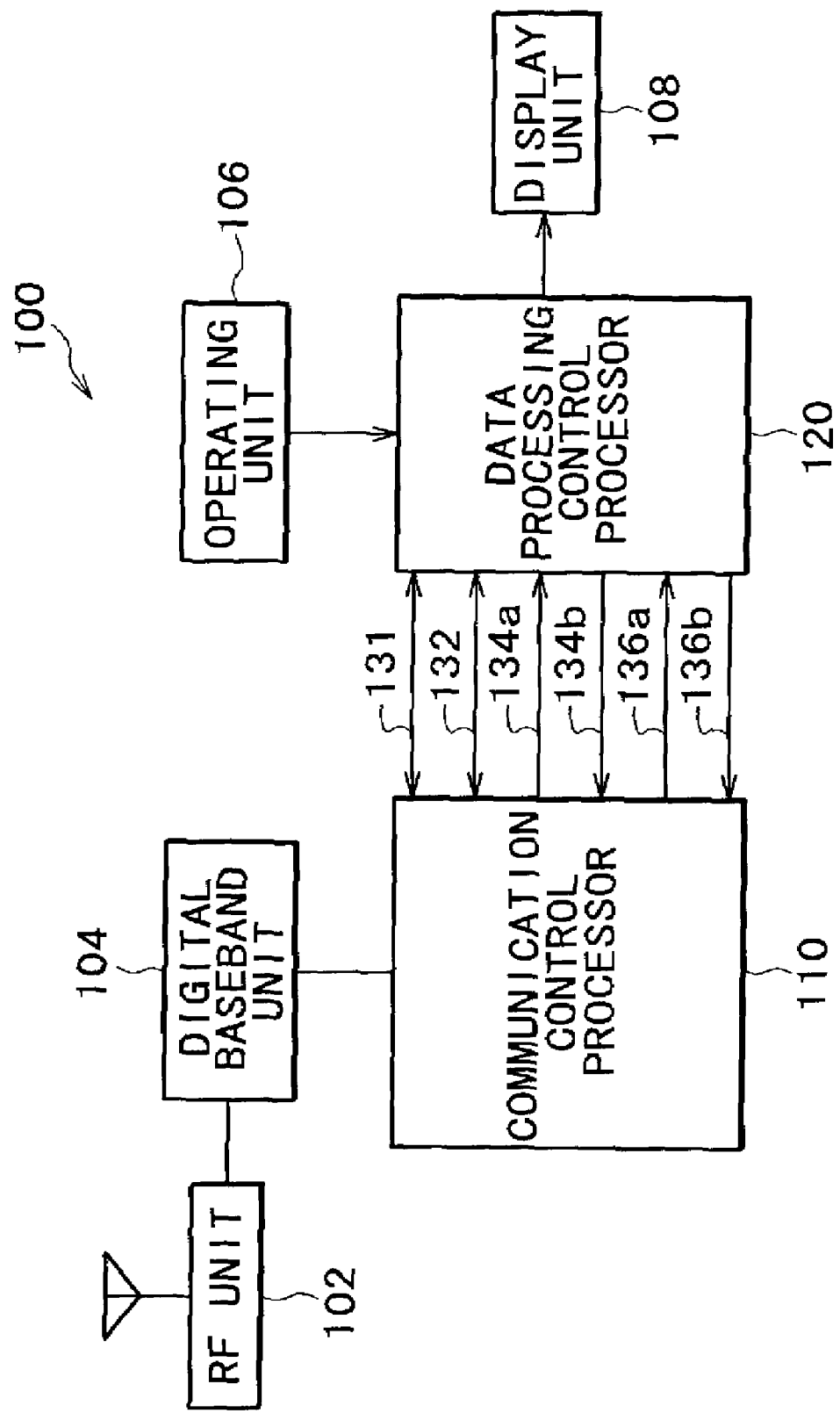
FIG. 1 is a functional block diagram showing an internal configuration of a conventional portable telephone.
Figure 2:
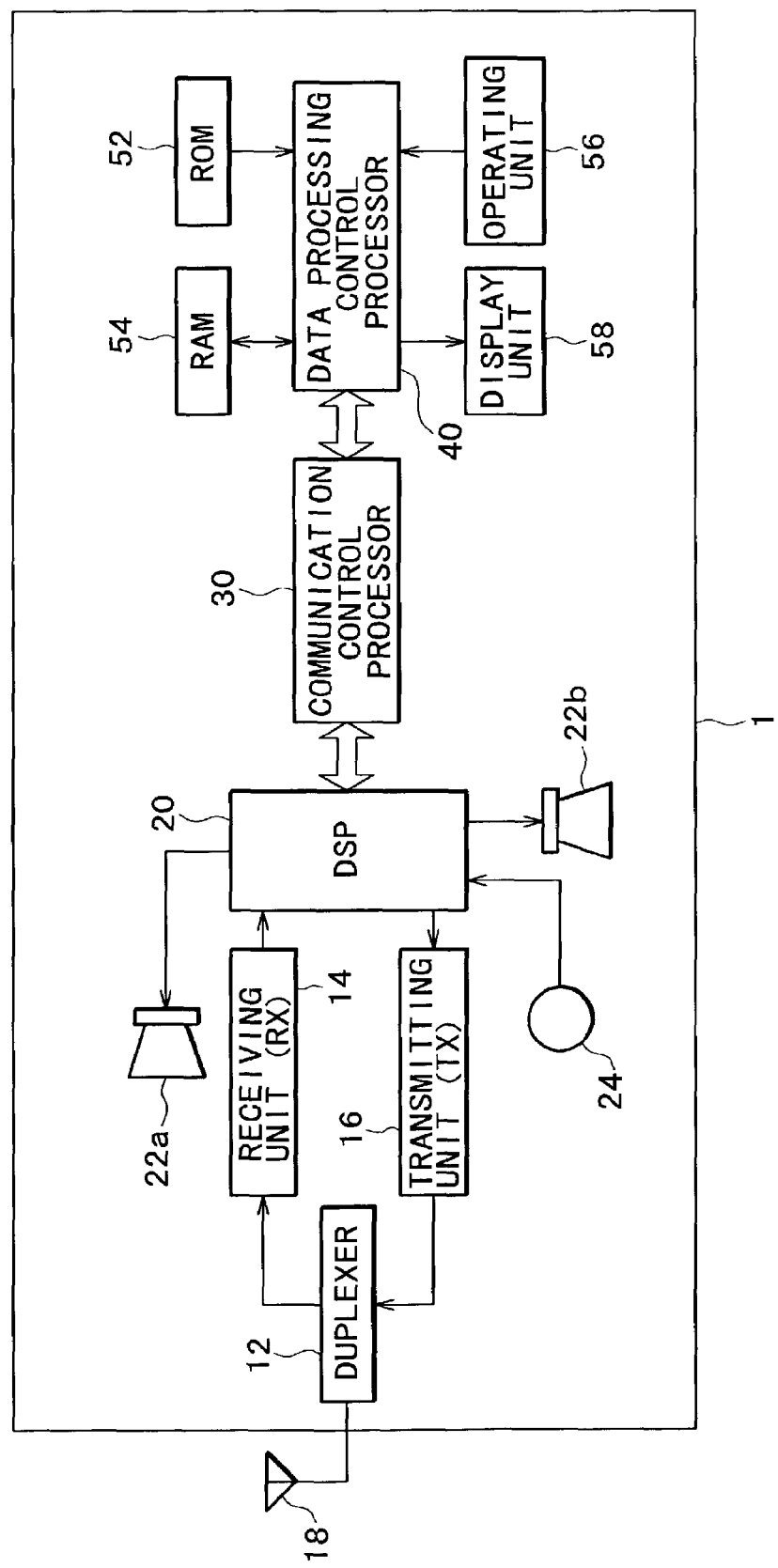
FIG. 2 is a functional block diagram showing a configuration of a portable communication terminal according to an embodiment of the present invention.

FIG. 2 is a functional block diagram showing a configuration of a portable communication terminal 1 according to an embodiment of the present invention. The portable communication terminal 1 includes a duplexer 12, a receiving unit (RX) 14, a transmitting unit (TX) 16, an antenna 18, a DSP (Digital Signal Processor) 20, speakers 22a and 22b, a microphone 24, a communication control processor 30, a data processing control processor 40, a ROM 52, a RAM 54, an operating unit 56, and a display unit 58.

The duplexer 12 outputs a received signal received via the antenna 18 to the receiving unit (RX) 14, and a transmitting signal outputted from the transmitting unit (TX) 16 to the antenna 18. The receiving unit (RX) 14 outputs the received signal outputted from the duplexer 12 to the DSP 20. The transmitting unit (TX) 16 outputs the transmitting signal outputted from the DSP 20 to the duplexer 12.

The DSP 20 exchanges data with the communication control processor 30. The DSP 20 also outputs an audio signal to the speaker 22a, and obtains an audio signal of a user from the microphone 24. Further, the DSP 20 supplies data received from the communication control processor 30 and the audio signal obtained from the microphone 24 to the transmitting unit (TX) 16, and supplies the received signal received from the receiving unit (RX) 14 to the speaker 22a and the communication control processor 30.

The speaker 22a outputs the signal received from the DSP 20 as sound. The speaker 22b is provided for other purposes (for example sounding a beep and a ring tone), and is controlled by the DSP 20. The microphone 24 obtains voice of the user.

The communication control processor 30 exchanges data with the DSP 20 and the data processing control processor 40.

The data processing control processor 40 reads data and a program from the ROM (Read Only Memory) 52 and receives an input by user operation from the operating unit 56 (for example a keypad). In addition, the data processing control processor 40 reads and writes data and programs from and to the RAM (Random Access Memory) 54. Further, the data processing control processor 40 supplies display data to the display unit 58 (for example a liquid crystal display). The display unit 58 displays the display data supplied thereto. The data processing control processor 40 also exchanges data with the communication control processor 30.

Figure 3A:
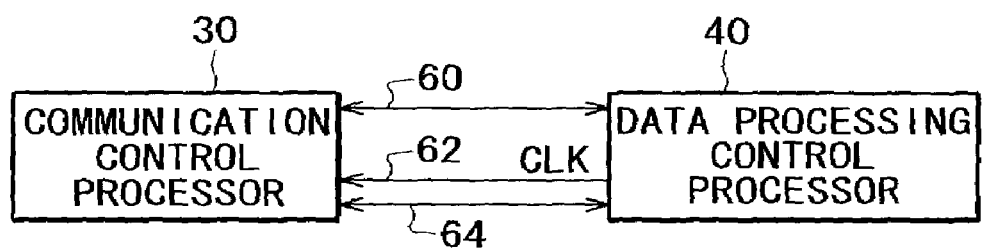
FIG. 3A is a diagram showing kinds of signals communicated between a communication control processor and a data processing control processor.

FIG. 3A shows kinds of signals communicated between the communication control processor 30 and the data processing control processor 40. As shown in FIG. 3A, a setup signal 60, a clock (CLK) signal 62, and a processing data signal 64 are communicated between the communication control processor 30 and the data processing control processor 40.

Figure 3B:
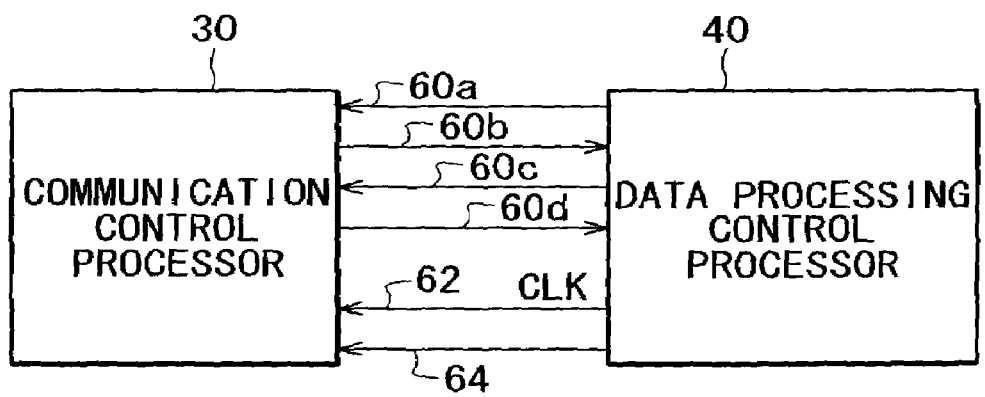
FIG. 3B is a diagram showing details of a setup signal.

The setup signal 60 is intended for initial setting prior to transmission and reception of the processing data signal. The number of transfer bytes in the transmission and reception, a transfer start address, a transfer cycle and the like are negotiated, for example. FIG. 3B shows the setup signal 60 in more detail. The setup signal 60 includes transmission data (TXD) 60a, reception data (RXD) 60b, a transmission request (RTSZ) 60c, and a transmission permit (CTSZ) 60d. The transmission data (TXD) 60a is setup transmission data transmitted from the data processing control processor 40 to the communication control processor 30. The reception data (RXD) 60b is setup reception data received from the communication control processor 30 by the data processing control processor 40. The transmission request (RTSZ) 60c is setup transmission data for requesting transmission of data by the communication control processor 30. The transmission permit (CTSZ) 60d is setup transmission data for permitting the data processing control processor 40 to transmit data to the communication control processor 30.

Returning to FIG. 3A, the clock (CLK) signal 62 is a second clock signal supplied from the data processing control processor 40 to the communication control processor 30. The processing data signal 64 is data communicated and to be subjected to data processing (displayed on the display unit 58, transmitted via the DSP 20, and the like) by the communication control processor 30 and the data processing control processor 40.

Figure 4:
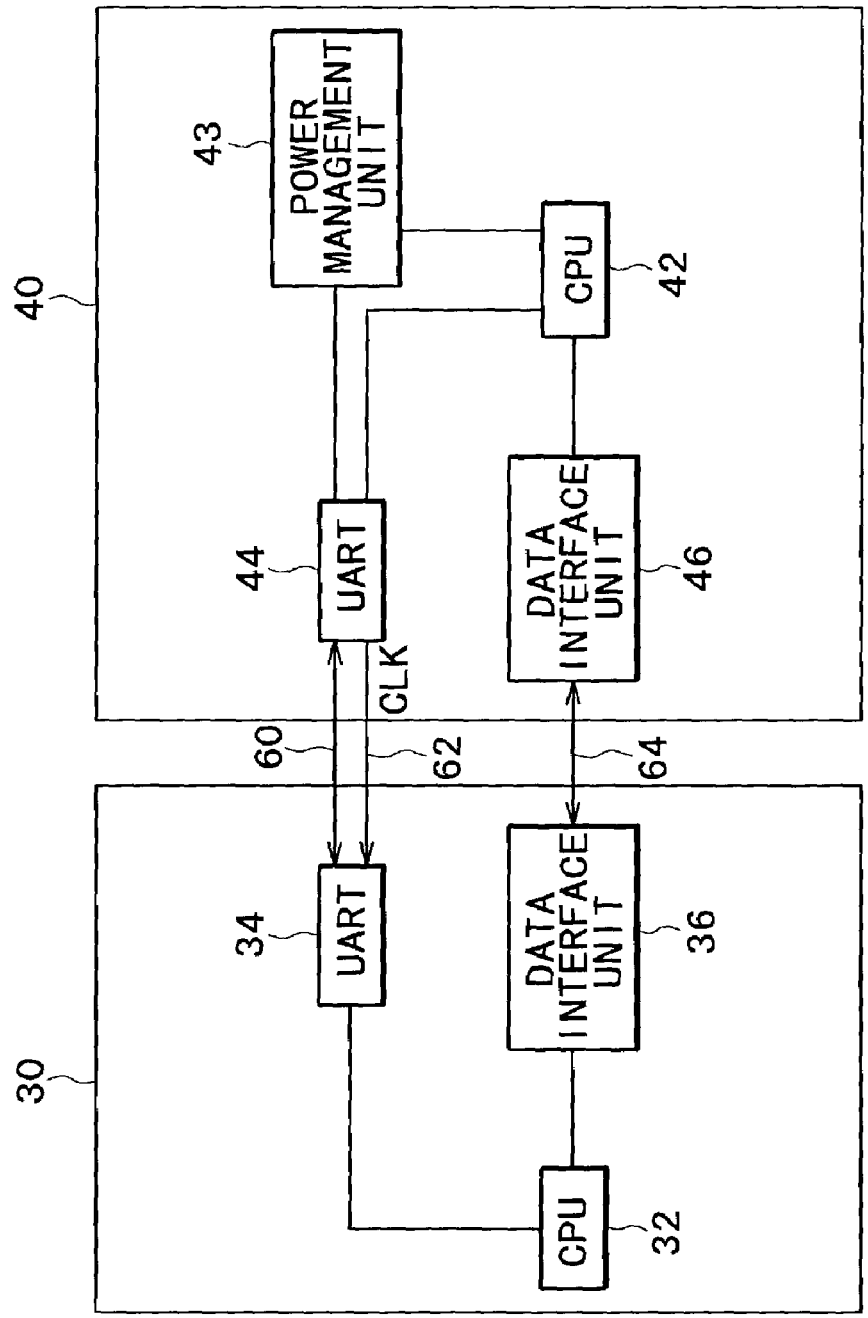
FIG. 4 is a block diagram showing a configuration of the communication control processor and the data processing control processor.

FIG. 4 is a block diagram showing a configuration of the communication control processor 30 and the data processing control processor 40.

The communication control processor 30 includes a CPU 32, a UART (Universal Asynchronous Receiver Transmitter) 34, and a data interface unit 36. The CPU 32 controls the UART 34 and the data interface unit 36. The UART 34 performs asynchronous serial communication with the data processing control processor 40 for communication of the setup signal 60 and the clock (CLK) signal 62. The data interface unit 36 and the data processing control processor 40 communicate therebetween the data to be subjected to data processing (displayed on the display unit 58, transmitted or received via the DSP 20, and the like).

The data processing control processor 40 includes a CPU 42, a power management unit 43, a UART 44, and a data interface unit 46. The CPU 42 controls the UART 44 and the data interface unit 46. The UART 44 performs asynchronous serial communication with the communication control processor 30 for communication of the setup signal 60 and the clock (CLK) signal 62. The data interface unit 46 and the communication control processor 30 communicate therebetween the data to be subjected to data processing (displayed on the display unit 58, transmitted or received via the DSP 20, and the like).

First Embodiment

A first embodiment represents a configuration when communication is performed from the communication control processor 30 to the data processing control processor 40 in the above-described portable communication terminal 1.

Figure 5:
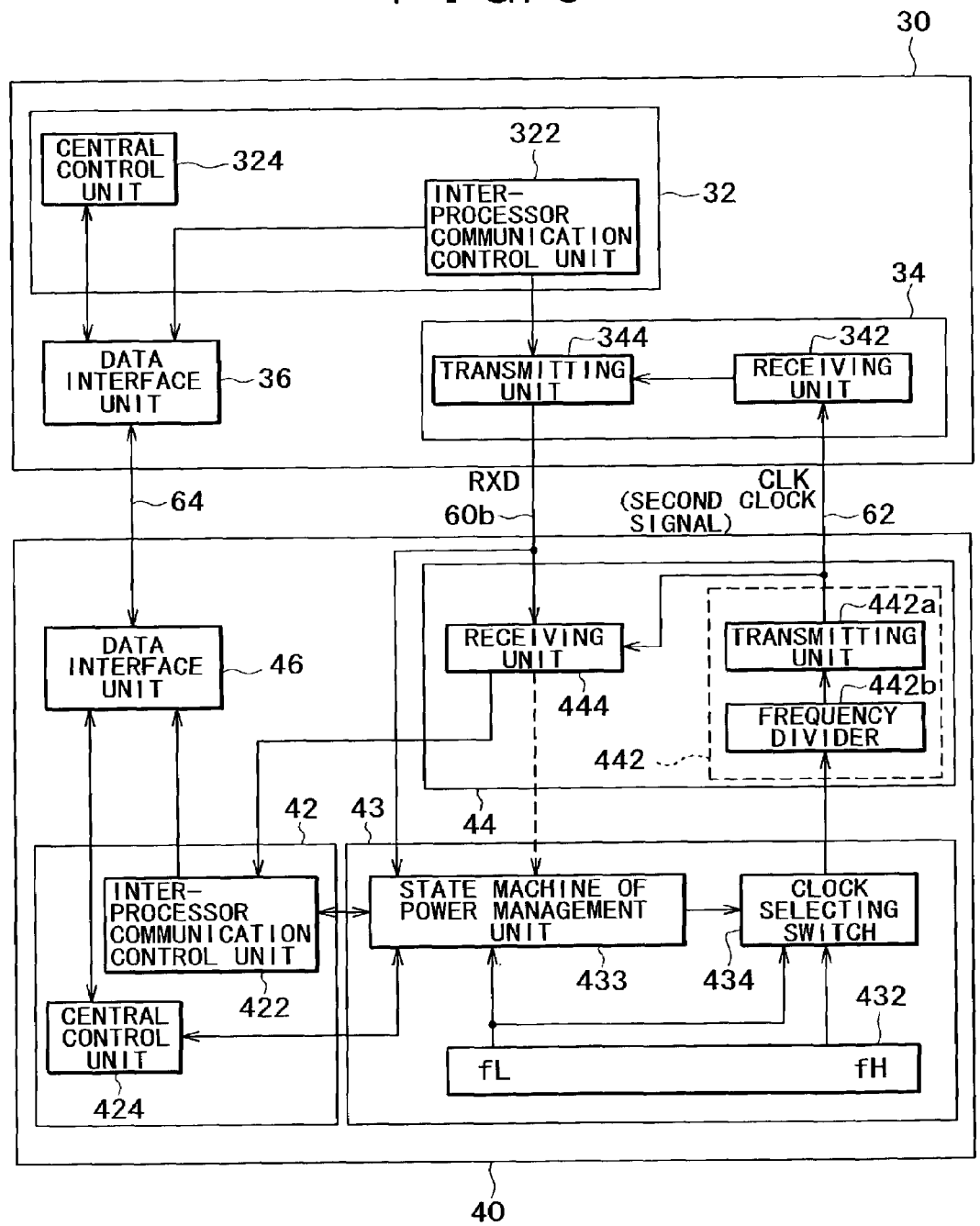
FIG. 5 is a functional block diagram showing details of a configuration of a communication control processor and a data processing control processor in a portable communication terminal according to a first embodiment.

FIG. 5 is a functional block diagram showing details of a configuration of a communication control processor 30 and a data processing control processor 40 in a portable communication terminal 1 according to the first embodiment.

The communication control processor 30 includes a CPU 32, a UART 34, and a data interface unit 36.

The CPU 32 has an inter-processor communication control unit 322 and a central control unit 324.

The inter-processor communication control unit 322 supplies reception data (RXD) 60b to the data processing control processor 40 via the UART 34, and receives a clock (CLK) signal 62 (corresponding to the second clock signal). When supplying the reception data (RXD) 60b, the inter-processor communication control unit 322 transmits the reception data (RXD) 60b at a baud rate obtained by dividing frequency of the clock (CLK) signal 62 by 16. In addition, the inter-processor communication control unit 322 controls the data interface unit 36 to set conditions of communication by the data interface unit 36.

The central control unit 324 communicates data to be subjected to data processing with the data processing control processor 40 via the data interface unit 36.

The UART 34 has a receiving unit 342 and a transmitting unit 344. The receiving unit 342 receives the clock (CLK) signal 62. The clock (CLK) signal 62 is used as a sampling clock (16 samplings per bit) for transmitting the reception data (RXD) 60b. The transmitting unit 344 receives output data from the inter-processor communication control unit 322, and then transmits the output data as the reception data (RXD) 60b to the data processing control processor 40.

The data interface unit 36 and the data processing control processor 40 communicate therebetween data to be subjected to data processing (displayed on a display unit 58, transmitted or received via a DSP 20, and the like).

The data processing control processor 40 includes a CPU 42, a power management unit 43, a UART 44, and a data interface unit 46.

The CPU 42 has an inter-processor communication control unit 422 and a central control unit 424.

The inter-processor communication control unit 422 receives the reception data (RXD) 60b from the communication control processor 30 via the UART 44. The inter-processor communication control unit 422 controls the data interface unit 46 to set conditions of communication by the data interface unit 46.

The central control unit 424 communicates data to be subjected to data processing with the communication control processor 30 via the data interface unit 46.

The power management unit 43 has a first clock signal supply unit 432, a state machine 433 of the power management unit, and a clock selecting switch 434.

The first clock signal supply unit 432 supplies a low-speed clock signal fL to the state machine 433 of the power management unit, and supplies the low-speed clock signal fL and a high-speed clock signal fH to the clock selecting switch 434. The low-speed clock signal fL or the high-speed clock signal fH is a first clock signal. The low-speed clock signal fL is a clock signal (with a frequency of 32 kHz) used in a clock of the portable communication terminal 1, for example. The high-speed clock signal fH has a frequency of 12 MHz, for example.

When the state machine 433 of the power management unit receives the reception data (RXD) 60b from the UART 34 in a sleep state, the state machine 433 of the power management unit turns the inter-processor communication control unit 422 and the central control unit 424 from a sleep state (with power ON and the high-speed clock signal fH OFF) into an awake state (with power ON and the high-speed clock signal fH ON). Then the state machine 433 of the power management unit notifies the clock selecting switch 434 of the state of the inter-processor communication control unit 422 and the central control unit 424 (whether the inter-processor communication control unit 422 and the central control unit 424 are in the awake state). Incidentally, a clock of the inter-processor communication control unit 422 and the central control unit 424 is not shown in the figure. The state machine 433 of the power management unit may receive the data from a receiving unit 444 and then turn the inter-processor communication control unit 422 and the central control unit 424 from the sleep state into the awake state. Incidentally, the low-speed clock signal fL is ON at all times.

The clock selecting switch 434 outputs the low-speed clock signal fL or the high-speed clock signal fH. The clock selecting switch 434 determines whether to output the low-speed clock signal fL or the high-speed clock signal fH on the basis of the data received from the state machine 433 of the power management unit. Specifically, when the inter-processor communication control unit 422 and the central control unit 424 are awake, the clock selecting switch 434 outputs the high-speed clock signal fH, whereas when the inter-processor communication control unit 422 and the central control unit 424 are in the sleep state or in a state of transition from the sleep state to the awake state (referred to as wake-up), the clock selecting switch 434 outputs the low-speed clock signal fL. Incidentally, switching between the low-speed clock signal fL and the high-speed clock signal fH is performed without a glitch (a pulse shorter than half a clock of the high-speed clock signal fH).

The UART 44 has a second clock signal supply unit 442 and a receiving unit 444.

The second clock signal supply unit 442 transmits a second clock signal (clock (CLK) signal 62) based on the first clock signal to the communication control processor 30. The second clock signal supply unit 442 has a transmitting unit 442a and a frequency divider 442b. The transmitting unit 442a transmits an output of the frequency divider 442b to the communication control processor 30. The frequency divider 442b divides frequency of the first clock signal by N, where N is an arbitrary integer. Incidentally, the frequency divider 442b is programmable.

The receiving unit 444 receives the reception data (RXD) 60b from the transmitting unit 344, stores a few characters on a FIFO (First In First Out) basis, and then supplies the characters to the inter-processor communication control unit 422.

The data interface unit 46 and the communication control processor 30 communicate therebetween data to be subjected to data processing (displayed on the display unit 58, transmitted via the DSP 20, and the like).

Figure 6:
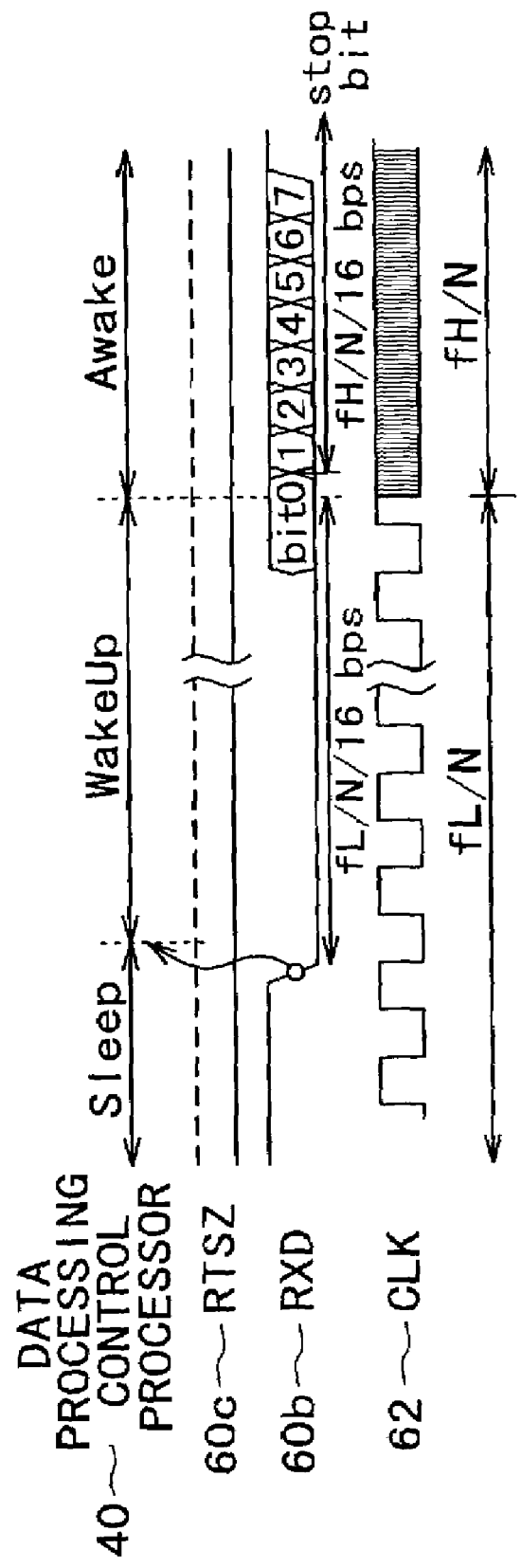
FIG. 6 is a timing chart of operation of the first embodiment.

Operation of the first embodiment will next be described with reference to a timing chart of FIG. 6.

First, the data processing control processor 40 is in a sleep state, and therefore the low-speed clock signal fL is supplied from the clock selecting switch 434 to the second clock signal supply unit 442. The second clock signal supply unit 442 divides the frequency of the low-speed clock signal fL by N, and supplies the result as the second clock signal (clock (CLK) signal 62) to the communication control processor 30.

Next, the inter-processor communication control unit 322 of the communication control processor 30 transmits the reception data (RXD) 60b to the data processing control processor 40 via the transmitting unit 344. The reception data (RXD) 60b is received as a falling edge portion by the state machine 433 of the power management unit of the data processing control processor 40.

Then, the state machine 433 of the power management unit turns the inter-processor communication control unit 422 and the central control unit 424 from a sleep state (with the power ON and the clock OFF) into an awake state (with the power ON and the clock ON). However, the inter-processor communication control unit 422 and the central control unit 424 do not become awake immediately, and go into a transitional state of wake-up. Also in this case, the signal obtained by dividing the frequency of the low-speed clock signal fL by N is the second clock signal.

The inter-processor communication control unit 422 and the central control unit 424 thereafter become awake. Then, the high-speed clock signal fH is supplied as the first clock signal from the clock selecting switch 434 to the second clock signal supply unit 442. The second clock signal supply unit 442 divides the frequency of the high-speed clock signal fH by N, and supplies the result as the second clock signal (clock (CLK) signal 62) to the communication control processor 30. In the meantime, the inter-processor communication control unit 322 continues to transmit the reception data (RXD) 60b in synchronism with the clock (CLK) signal 62. The reception data (RXD) 60b is received by the inter-processor communication control unit 422 via the receiving unit 444.

Thus, the inter-processor communication control unit 322 and the inter-processor communication control unit 422 transmit and receive therebetween setup signals via the UART 34 and the UART 44 to negotiate initial data interface settings and the like.

After the initial settings are completed, the CPU 32 and the CPU 42 transmit and receive a processing data signal via the data interface unit 36 and the data interface unit 46. The processing data signal is displayed on the display unit 58, for example.

According to the first embodiment, the data processing control processor 40 is supplied with the low-speed clock signal fL, and the communication control processor 30 is supplied with the second clock signal (clock (CLK) signal 62). Thus, even when the data processing control processor 40 is in the sleep state, it is possible to perform communication for a setup for transmission of the processing data signal from the communication control processor 30 to the data processing control processor 40. In addition, the communication control processor 30 can transmit the reception data (RXD) 60b regardless of whether the data processing control processor 40 is in the sleep state.

Moreover, since the frequency of the first clock signal is divided by the frequency divider 442b and the result is used as the second clock signal, the clock frequency of the second clock signal is lowered, which results in a further reduction in power consumption.

Furthermore, when the data processing control processor 40 needs to receive data from the communication control processor 30 and process the data (to display the data on the display unit 58, for example), the data processing control processor 40 is shifted from the sleep state to the awake state, and hence the data processing control processor 40 can process the data. In addition, even when the low-speed clock signal fL is the first clock signal, that is, the data processing control processor 40 is in the sleep state or the state of transition to the awake state, the communication control processor 30 does not need to stop signal transmission to the data processing control processor 40, and no error in reception occurs.

Second Embodiment

A second embodiment represents a configuration when communication is performed from the data processing control processor 40 to the communication control processor 30 in the above-described portable communication terminal 1.

Figure 7:
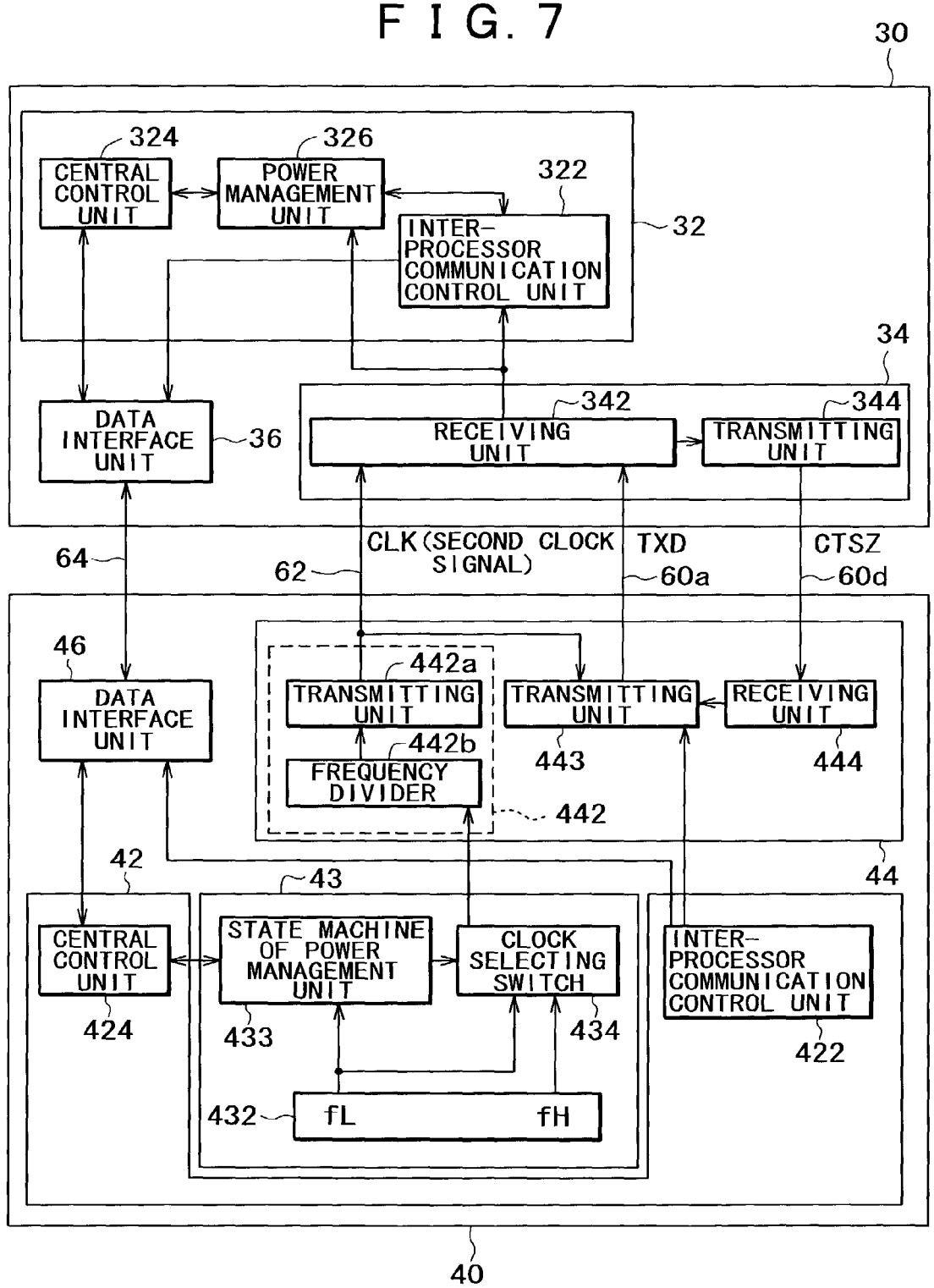
FIG. 7 is a functional block diagram showing details of a configuration of a communication control processor and a data processing control processor in a portable communication terminal according to a second embodiment.

FIG. 7 is a functional block diagram showing details of a configuration of a communication control processor 30 and a data processing control processor 40 in a portable communication terminal 1 according to the second embodiment.

The communication control processor 30 includes a CPU 32, a UART 34, and a data interface unit 36.

The CPU 32 has an inter-processor communication control unit 322, a central control unit 324, and a power management unit 326.

The inter-processor communication control unit 322 receives transmission data (TXD) 60a from the data processing control processor 40 via the UART 34. In addition, the inter-processor communication control unit 322 controls the data interface unit 36 to set conditions of communication by the data interface unit 36.

The central control unit 324 communicates data to be subjected to data processing with the data processing control processor 40 via the data interface unit 36.

The power management unit 326 receives the transmission data (TXD) 60a via the UART 34, and thereby turns the inter-processor communication control unit 322 and the central control unit 324 from a sleep state (with power ON and the clock OFF) into an awake state (with power ON and the clock ON). Then, depending on a FIFO status of a receiving unit 342, a transmission permit (CTSZ) 60d is transmitted to the data processing control processor 40 via the UART 34. Incidentally, a clock of the inter-processor communication control unit 322 and the central control unit 324 is not shown in the figure. The transmission permit (CTSZ) 60d is low (permitting transmission) when there is FIFO vacancy in the receiving unit 342, and is high (not permitting transmission) when there is no FIFO vacancy in the receiving unit 342.

The UART 34 has the receiving unit 342 and a transmitting unit 344.

The receiving unit 342 receives a clock (CLK) signal 62 and the transmission data (TXD) 60a. The clock (CLK) signal 62 is used to sample data to be transmitted and received by the UART 34 (16 CLKs per bit). Further, the receiving unit 342 stores one character of the transmission data (TXD) 60a, buffers the transmission data (TXD) 60a on a FIFO (First In First Out) basis, and then supplies the transmission data (TXD) 60a to the inter-processor communication control unit 322 and the power management unit 326.

The transmitting unit 344 transmits the transmission permit (CTSZ) 60d to the data processing control processor 40, depending on the FIFO vacancy state of the receiving unit 342.

The data interface unit 36 and the data processing control processor 40 communicate therebetween data to be subjected to data processing (displayed on a display unit 58, transmitted via a DSP 20, and the like).

The data processing control processor 40 includes a CPU 42, a power management unit 43, a UART 44, and a data interface unit 46.

The CPU 42 has an inter-processor communication control unit 422 and a central control unit 424.

The inter-processor communication control unit 422 transmits the transmission data (TXD) 60a to the communication control processor 30 via the UART 44. When the transmission permit (CTSZ) 60d indicating permission for transmission is received from the communication control processor 30, the inter-processor communication control unit 422 transmits the transmission data (TXD) 60a. When the transmission permit (CTSZ) 60d that does not indicate permission for transmission is received from the communication control processor 30, the inter-processor communication control unit 422 stops transmitting the transmission data (TXD) 60a. The inter-processor communication control unit 422 controls the data interface unit 46 to set conditions of communication by the data interface unit 46.

The central control unit 424 communicates data to be subjected to data processing with the communication control processor 30 via the data interface unit 46.

The power management unit 43 has a first clock signal supply unit 432, a state machine 433 of the power management unit, and a clock selecting switch 434.

The first clock signal supply unit 432 supplies a low-speed clock signal fL to the state machine 433 of the power management unit, and supplies the low-speed clock signal fL and a high-speed clock signal fH to the clock selecting switch 434. The low-speed clock signal fL or the high-speed clock signal fH is a first clock signal. The low-speed clock signal fL is a clock signal (with a frequency of 32 kHz) used in a clock of the portable communication terminal 1, for example. The high-speed clock signal fH has a frequency of 12 MHz, for example.

In response to a user operation from an operating unit 56, the state machine 433 of the power management unit turns the inter-processor communication control unit 422 and the central control unit 424 from a sleep state (with power ON and the high-speed clock signal fH OFF) into an awake state (with power ON and the high-speed clock signal fH ON). Then the state machine 433 of the power management unit notifies the clock selecting switch 434 of the state of the inter-processor communication control unit 422 and the central control unit 424 (whether the inter-processor communication control unit 422 and the central control unit 424 are in the awake state).

The clock selecting switch 434 outputs the low-speed clock signal fL or the high-speed clock signal fH. The clock selecting switch 434 determines whether to output the low-speed clock signal fL or the high-speed clock signal fH on the basis of the data received from the state machine 433 of the power management unit. Specifically, when the inter-processor communication control unit 422 and the central control unit 424 are awake, the clock selecting switch 434 outputs the high-speed clock signal fH, whereas when the inter-processor communication control unit 422 and the central control unit 424 are in a sleep state or in a state of transition from the sleep state to the awake state (referred to as wake-up), the clock selecting switch 434 outputs the low-speed clock signal fL. Incidentally, switching between the low-speed clock signal fL and the high-speed clock signal fH is performed without a glitch (a pulse shorter than half a clock of the high-speed clock signal fH).

The UART 44 has a second clock signal supply unit 442, a transmitting unit 443, and a receiving unit 444.

The second clock signal supply unit 442 transmits a second clock signal (clock (CLK) signal 62) based on the first clock signal to the communication control processor 30. The second clock signal supply unit 442 has a transmitting unit 442a and a frequency divider 442b. The transmitting unit 442a transmits an output of the frequency divider 442b to the communication control processor 30. The frequency divider 442b divides frequency of the first clock signal by N, where N is an arbitrary integer. Incidentally, the frequency divider 442b is programmable. The clock (CLK) signal 62 is used to sample the transmission data (TXD) 60a from the transmitting unit 443 and reception data 60b from the receiving unit 444. The clock (CLK) signal 62 is also used to sample the reception data 60b from the transmitting unit 344 and the transmission data 60a to the receiving unit 342. Sixteen samplings are performed per bit.

The transmitting unit 443 receives a signal from the inter-processor communication control unit 422, and transmits the signal as the transmission data (TXD) 60a to the communication control processor 30.

The receiving unit 444 receives the transmission permit (CTSZ) 60d from the transmitting unit 344.

The data interface unit 46 and the communication control processor 30 communicate therebetween data to be subjected to data processing (displayed on the display unit 58, transmitted via the DSP 20, and the like).

Figure 8:
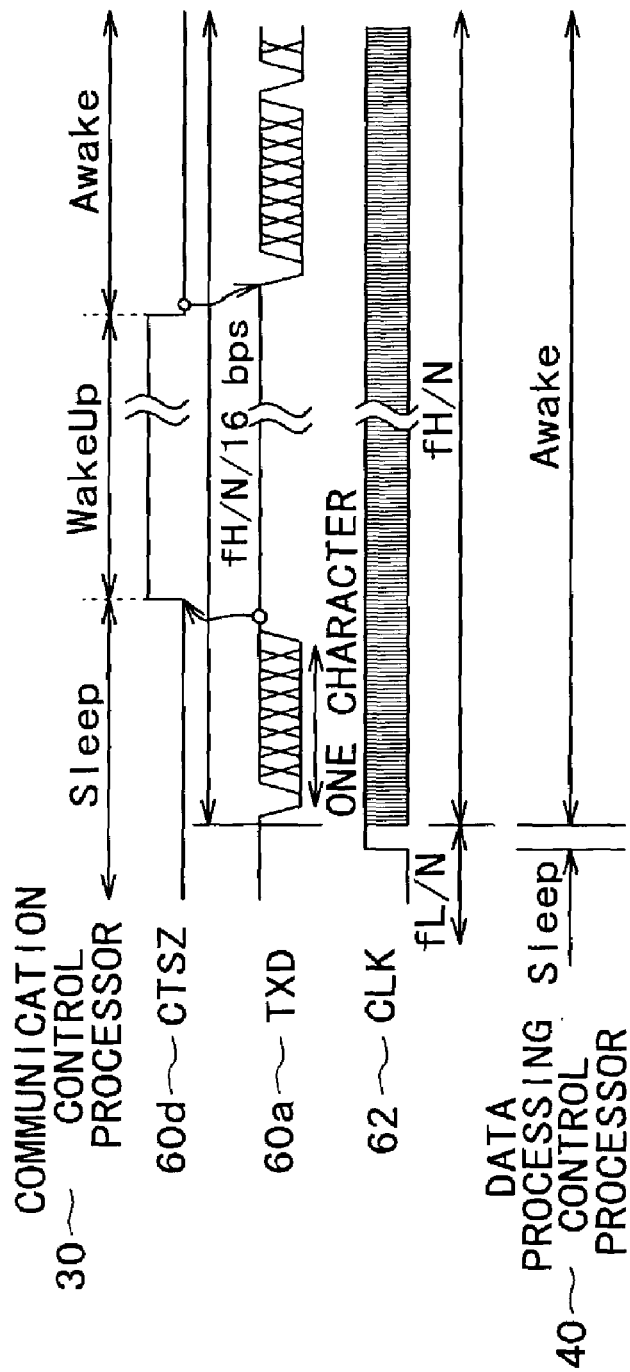
FIG. 8 is a timing chart of operation of the second embodiment.

Operation of the second embodiment will next be described with reference to a timing chart of FIG. 8.

First, the data processing control processor 40 is in a sleep state, and therefore the low-speed clock signal fL is supplied as the first clock signal from the clock selecting switch 434 to the second clock signal supply unit 442. The second clock signal supply unit 442 divides the frequency of the low-speed clock signal fL by N, and supplies the result as the second clock signal (clock (CLK) signal 62) to the communication control processor 30.

Next, in response to a user operation from the operating unit 56, the state machine 433 of the power management unit turns the inter-processor communication control unit 422 and the central control unit 424 from a sleep state (with power ON and the high-speed clock signal fH OFF) into an awake state (with power ON and the high-speed clock signal fH ON). The high-speed clock signal fH is supplied as the first clock signal from the clock selecting switch 434 to the second clock signal supply unit 442. The second clock signal supply unit 442 divides the frequency of the high-speed clock signal fH by N, and supplies the result as the second clock signal (clock (CLK) signal 62) to the communication control processor 30.

When the data processing control processor 40 becomes awake, the inter-processor communication control unit 422 transmits the transmission data (TXD) 60a to the communication control processor 30 via the UART 44. The transmission data (TXD) 60a is received by the UART 34 in the communication control processor 30. The receiving unit 342 in the UART 34 stores one character of the transmission data (TXD) 60a, and then generates an interrupt. Incidentally, one more byte may come in depending on the timing; however, this presents no problem because the byte is accumulated in the receiving unit 342 (FIFO).

In response to the interrupt, the power management unit 326 turns the inter-processor communication control unit 322 and the central control unit 324 from the sleep state into the awake state. The power management unit 326 may turn the inter-processor communication control unit 322 and the central control unit 324 from the sleep state into the awake state immediately after receiving the transmission data (TXD) 60a from the data processing control processor 40.

Since the transmission permit (CTSZ) 60d becomes high, the transmitting unit 443 in the UART 44 stops transmitting the transmission data (TXD) 60a.

Thereafter, the inter-processor communication control unit 322 and the central control unit 324 become awake, and the inter-processor communication control unit 322 reads FIFO data from the receiving unit 342. The transmission permit (CTSZ) 60d thereby becomes low, and is transmitted to the data processing control processor 40 via the UART 34. Since the transmission permit (CTSZ) 60d is low, the transmitting unit 443 in the UART 44 resumes transmitting the transmission data (TXD) 60a.

Thus, the inter-processor communication control unit 322 and the inter-processor communication control unit 422 perform signal communication for making initial settings therebetween via the UART 34 and the UART 44 prior to transmission and reception of a processing data signal.

After the initial settings are completed, the CPU 32 and the CPU 42 transmit and receive a processing data signal via the data interface unit 36 and the data interface unit 46. The processing data signal is transmitted via the DSP 20, for example.

According to the second embodiment, the data processing control processor 40 can transmit the transmission data (TXD) 60a regardless of whether the communication control processor 30 is in the sleep state.

In addition, when the communication control processor 30 needs to receive data from the data processing control processor 40 and process the data (to transmit the data via the DSP 20, for example), the communication control processor 30 is shifted from the sleep state to the awake state, and hence the communication control processor 30 can process the data.

The above embodiments can be realized as follows. A computer including a CPU, a hard disk, a flash memory, and a media (such as floppy disks, CD-ROMs, memory sticks and the like) reading device has the media reading device read a medium on which a program for realizing the above-described parts is recorded, and then installs the program on the hard disk, the flash memory or the like. The above-described functions can be realized also by such a method.

While a preferred embodiment of the present invention has been described using specific terms, such description is for illustrative purposes only, and it is to be understood that changes and variations may be made without departing from the spirit or scope of the following claims.

What is claimed is:

1. A portable communication terminal comprising:
communication control means for controlling communication of said portable communication terminal with a unit external thereto;
data processing control means for performing communication with said communication control means; and
first clock signal supply means for supplying a first clock signal to said data processing control means,
wherein said data processing control means includes second clock signal supply means for supplying a second clock signal based on said first clock signal to said communication control means,
wherein said data processing control means is shifted from a sleep state to an awake state using a reference timing of receiving a signal from said communication control means, and
wherein said data processing control means is shifted from the sleep state to the awake state after receiving the signal from said communication control means and upon receiving a signal of a predetermined magnitude.

2. The portable communication terminal as claimed in claim 1,
wherein said second clock signal supply means includes frequency dividing means for dividing a frequency of said first clock signal.

3. The portable communication terminal as claimed in claim 1,
wherein said first clock signal comprises a high-speed clock signal and a low-speed clock signal; and
said portable communication terminal further includes clock signal selecting means for selecting said high-speed clock signal as said first clock signal supplied to said second clock signal supply means when said data processing control means is in an awake state, and selecting said low-speed clock signal supplied as said first clock signal to said second clock signal supply means when said data processing control means is in one of a sleep state and a state of transition to the awake state.

4. A portable communication terminal comprising:
communication control means for controlling communication of said portable communication terminal with a unit external thereto;
data processing control means for performing communication with said communication control means; and
first clock signal supply means for supplying a first clock signal to said data processing control means,
wherein said data processing control means includes a second clock signal supply means for supplying a second clock signal based on said first clock signal to said communication control means,
wherein said communication control means is shifted from a sleep state to an awake state using a reference timing of receiving a signal from said data processing control means, and
wherein said communication control means is shifted from the sleep state to the awake state after receiving the signal from said data processing control means and upon receiving a signal of a predetermined magnitude.

5. A communication method for use with a portable communication terminal, said portable communication terminal performing communication with an other unit external thereto and including communication control means for controlling the communication with the other unit and data processing control means for performing communication with said communication control means, said communication method comprising:

a first clock signal supply step of supplying a first clock signal to said data processing control means;

a second clock signal supply step of supplying a second clock signal based on said first clock signal from said data processing control means to said communication control means, and a step of shifting said data processing control means from a sleep state to an awake state using a reference timing of receiving a signal from said communication control means, wherein said data processing control means is shifted from the sleep state to the awake state after receiving the signal from said communication control means and upon receiving a signal of a predetermined magnitude.

6. A program for a computer to perform communication processing of a portable communication terminal, said portable communication terminal performing communication with an other unit external thereto and including communication control means for controlling the communication with the other unit and data processing control means for performing communication with said communication control means, said program comprising:

a first clock signal supply step of supplying a first clock signal to said data processing control means;

a second clock signal supply step of supplying a second clock signal based on said first clock signal from said data processing control means to said communication control means; and a step of shifting said data processing control means from a sleep state to an awake state using a reference timing of receiving a signal from said communication control means, wherein said data processing control means is shifted from the sleep state to the awake state after receiving the signal from said communication control means and upon receiving a signal of a predetermined magnitude.

7. A computer readable recording medium having a program recorded thereon, said program being for a computer to perform communication processing of a portable communication terminal, said portable communication terminal performing communication with an other unit external thereto and including communication control means for controlling the communication with the other unit and data processing control means for performing communication with said communication control means, said program including:

a first clock signal supply step of supplying a first clock signal to said data processing control means;

a second clock signal supply step of supplying a second clock signal based on said first clock signal from said data processing control means to said communication control means; and wherein said data processing control means is shifted from a sleep state to an awake state using a reference timing of receiving a signal from said communication control means, a step of shifting said data processing control means from the sleep state to the awake state after receiving the signal from said communication control means and upon receiving a signal of a predetermined magnitude.

* * * * *

UNITED STATES PATENT AND TRADEMARK OFFICE
CERTIFICATE OF CORRECTION

PATENT NO. : 7,003,277 B2  Page 1 of 1
DATED : February 21, 2006
INVENTOR(S) : Masahiro Toshida It is certified that error appears in the above-identified patent and that said Letters Patent is hereby corrected as shown below:

<u>Title page,</u>
Insert Item -- [30] Foreign Application Priority Data,
    Japan 2001-297178 filed September 27, 2001 --.

Signed and Sealed this

Twenty-third Day of May, 2006

JON W. DUDAS
*Director of the United States Patent and Trademark Office*